2 Sheets—Sheet 2.
L. FUNKE.
CAR-STARTER.
No. 173,536. Patented Feb. 15, 1876.
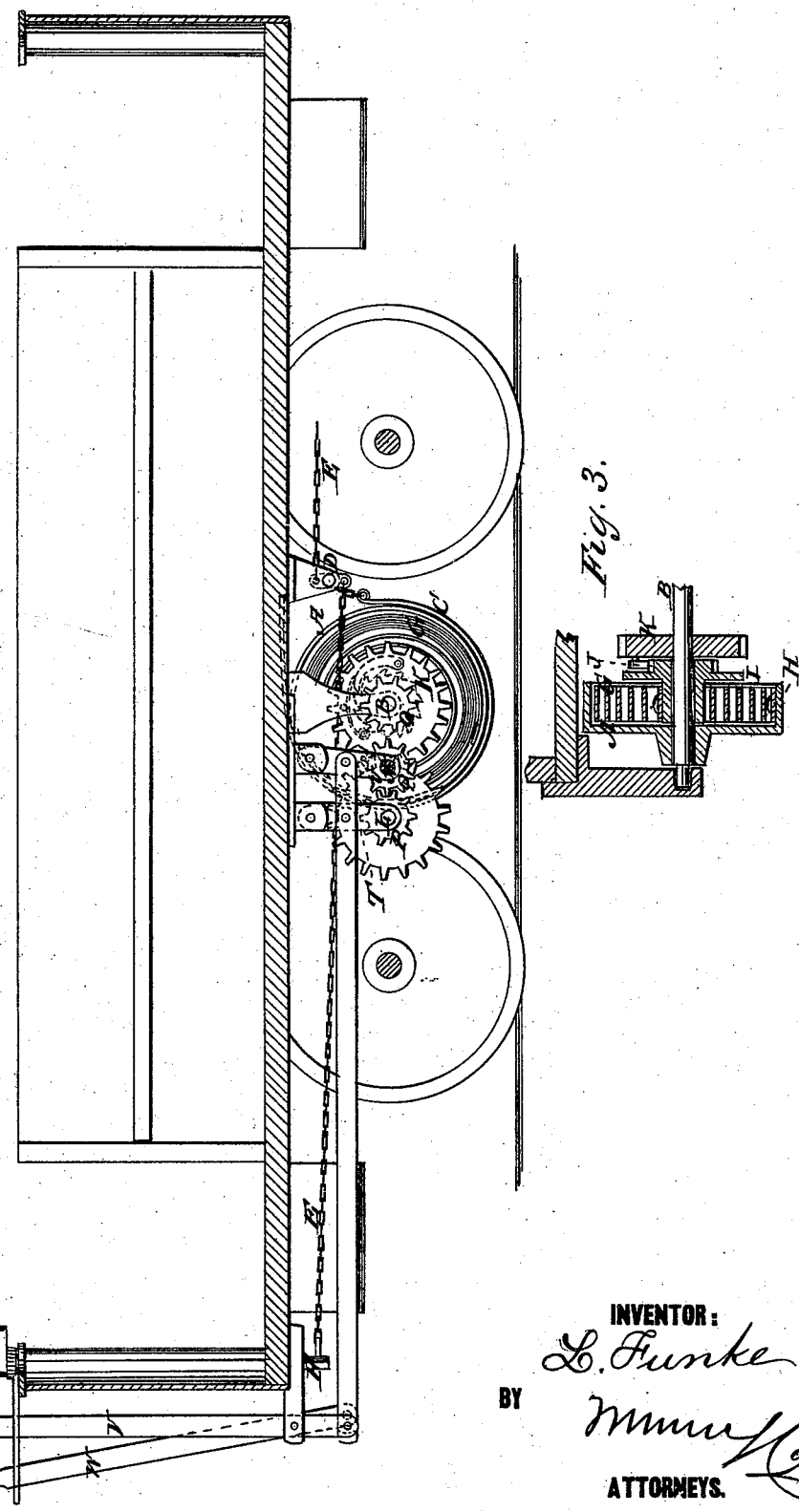
WITNESSES:
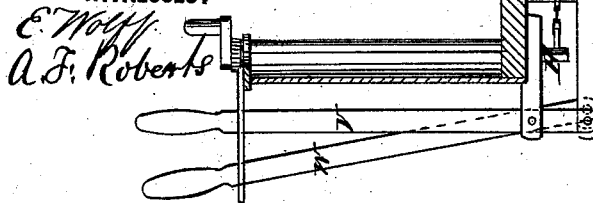
INVENTOR:
L. Funke
BY
ATTORNEYS.

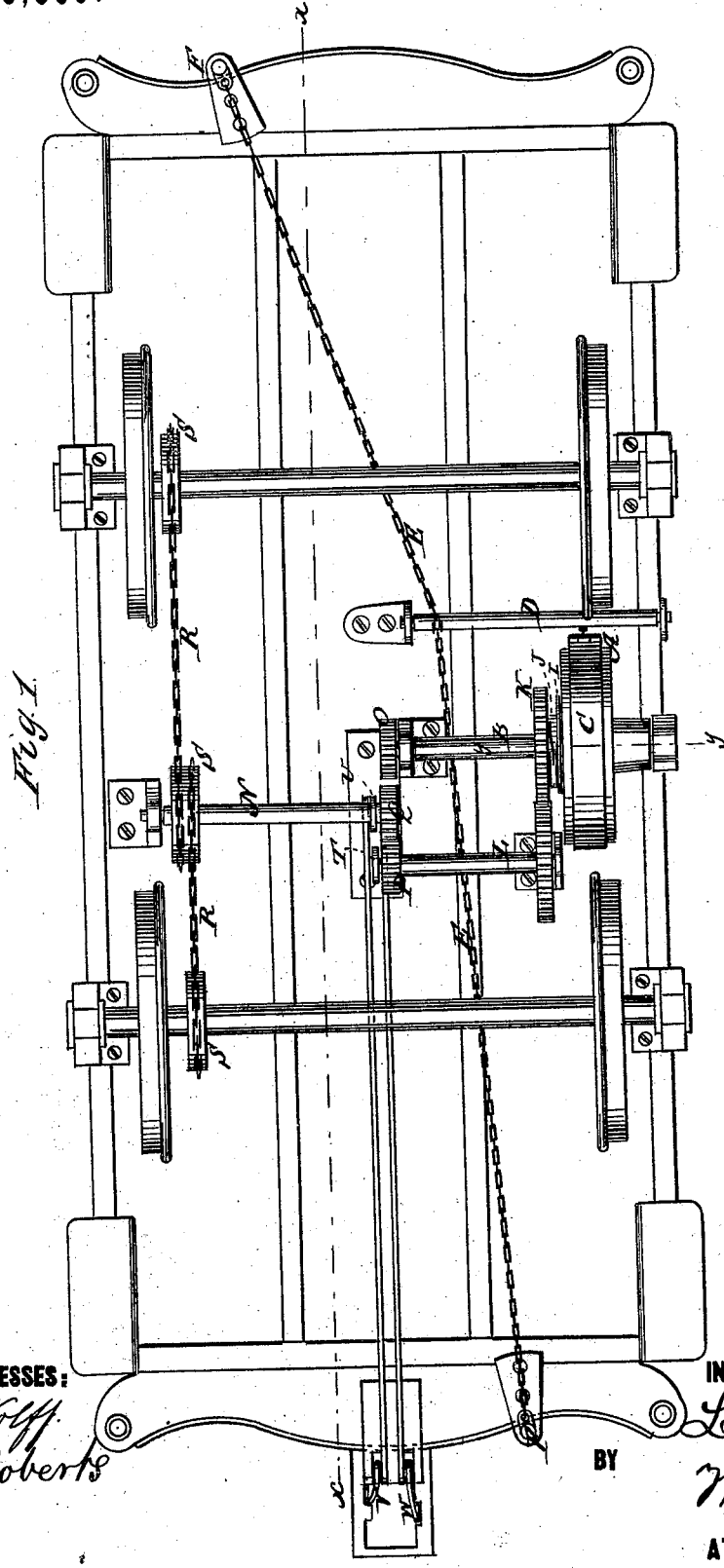

UNITED STATES PATENT OFFICE.

LOUIS FUNKE, OF CHAMPION MILLS, NEW MEXICO TERRITORY.

IMPROVEMENT IN CAR-STARTERS.

Specification forming part of Letters Patent No. 173,536, dated February 15, 1876; application filed December 4, 1875.

*To all whom it may concern:*

Be it known that I, LOUIS FUNKE, of Champion Mills, in the county of Valencia and Territory of New Mexico, have invented a new and Improved Combined Car Brake and Starter, of which the following is a specification:

The invention consists of a brake-drum geared with the axle by a reversing-train, and contrived with a spring for storing up the power exerted by the brake in stopping, so that, by shifting the gears after stopping the car, the spring will assist in starting, all as hereinafter described.

Figure 1 is a plan of the bottom of a car with my improved brake and starter. Fig. 2 is a longitudinal sectional elevation taken on the line $x\ x$ of Fig. 1. Fig. 3 is a detail in section.

Similar letters of reference indicate corresponding parts.

A is a brake-drum, fitted loosely on the shaft B, and having a friction-strap, C, connected to the shaft D, which is worked by the chains E and shafts F. The drum contains a coiled spring, G, connected at its outer end H to the drum, and at its inner end to the hub I, which gears, by the ratchet and pawl J, with the wheel K, made fast to the shaft, so that the shaft winds the spring up when the drum is arrested by the brake, and the shaft continues turning in the forward direction; but when the spring unwinds in pushing the car forward at starting, this ratchet contrivance lets the spring slip around the shaft, in case the driver neglects to throw the shaft out of gear at the moment the spring is unwound. This shaft B gears with another shaft, L, by the wheels K and M, and these two shafts gear alternately with the shaft N by their pinions O P, and the pinion Q on shaft N. This shaft is geared, by chains R and pulleys S, with the car-axles, so as to be kept running when the car runs. When it gears with shaft B the ratchet J winds the spring up, to store up the power exerted by the brake on the drum A in stopping the car. When it gears with shaft L, the spring expends its power on the car through shaft N and the chains for starting the car. In order to enable the pinion Q to engage with one of the pinions O or P before disengaging from the other, by which the spring would be set free, both the shafts L and N are mounted in shifting bearing-standards T U, each having a shifting-lever, V W, at the platform. The lever V shifts the pinion Q from one to the other of pinions O P, and the lever W shifts pinion P toward pinion O, so that pinion Q will engage both together, and then shifts away together with pinion Q, in case they are to be connected for applying the power of the spring to the starting of the car, and without it in case the spring is to be wound up by the stopping of the car.

Having thus described my invention, I claim as new and desire to secure by Letters Patent—

1. The shaft N, geared with the car-axles, the reversing-shafts L B, and the coiled spring and brake, combined and arranged substantially as specified.

2. The spring connected to the winding-shaft B by a ratchet and pawl, when combined with a shaft, L, gearing with the car-axles, for applying the power of the spring to start the car, substantially as specified.

LOUIS FUNKE.

Witnesses:
LOUIS HANING,
GEORGE HARTMANN.